US006271184B1

(12) United States Patent
Seebauer et al.

(10) Patent No.: US 6,271,184 B1
(45) Date of Patent: Aug. 7, 2001

(54) VISCOSITY IMPROVERS FOR LUBRICATING OIL-COMPOSITIONS

(75) Inventors: Joseph G. Seebauer, Mentor; Charles P. Bryant, Euclid, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/609,141

(22) Filed: Jun. 30, 2000

Related U.S. Application Data

(62) Division of application No. 09/218,905, filed on Dec. 12, 1998, now Pat. No. 6,124,249.

(51) Int. Cl.⁷ .................................................. C10M 145/22
(52) U.S. Cl. .......................... 508/469; 508/470; 508/471; 526/212; 526/213; 526/214; 526/217; 526/224; 526/310; 526/318.44; 526/328; 526/328.5
(58) Field of Search ..................................... 526/212, 213, 526/214, 217, 224, 328, 328.5, 310, 318.44; 508/469, 470, 471

(56) References Cited

U.S. PATENT DOCUMENTS

| | | |
|---|---|---|
| 2,965,572 | 12/1960 | Wuellner et al. . |
| 3,251,906 | 5/1966 | Bauer .................................... 260/881 |
| 3,252,949 | 5/1966 | Fields et al. ......................... 260/80.5 |
| 3,506,574 | 4/1970 | Stambaugh et al. ................. 252/51.5 |
| 3,732,334 | 5/1973 | Koch et al. ........................... 260/875 |
| 4,281,081 | 7/1981 | Jost et al. ............................. 525/281 |
| 4,338,418 | 7/1982 | Jost et al. ............................. 525/281 |
| 4,548,990 | 10/1985 | Mueller et al. ...................... 625/123 |
| 4,758,364 | 7/1988 | Seki et al. ........................... 252/56 R |
| 4,822,508 | 4/1989 | Pennewiss et al. ................ 252/56 R |
| 4,867,894 | 9/1989 | Pennewiss et al. ..................... 252/56 |
| 4,968,444 | 11/1990 | Knoell et al. ....................... 252/56 R |
| 5,043,087 | 8/1991 | Pennewiss et al. ............. 252/51.5 R |
| 5,108,635 | 4/1992 | Gabillet et al. .................... 252/56 R |
| 5,516,440 | 5/1996 | Dasai et al. ............................. 252/32 |
| 5,622,924 | 4/1997 | Sakai et al. ........................... 508/469 |
| 5,703,023 | 12/1997 | Srinivasan ............................ 508/468 |
| 5,969,068 | * 10/1999 | Bryant et al. ........................ 526/265 |

FOREIGN PATENT DOCUMENTS

| | | |
|---|---|---|
| 1 420 219A | 11/1968 | (DE) . |
| 1794257 | 2/1971 | (DE) . |
| 0393899 | 4/1990 | (EP) . |
| 0436872 | 7/1991 | (EP) . |
| 0439254 | 7/1991 | (EP) . |
| 0 635 560 A | 2/1995 | (EP) . |
| 0 750 031 A | 12/1996 | (EP) . |
| 1068283 | 5/1967 | (GB) . |
| 94/18288 | 8/1994 | (WO) . |

OTHER PUBLICATIONS

Derwent Abstract 78–37156A (Re JP 53039306, Sanyo).
Derwent Abstract 68–15544Q (Re DE 1 420 219).
GB 1272324—English language counterpart of DE 1794257.

* cited by examiner

Primary Examiner—Margaret Medley
Assistant Examiner—Cephia D. Toomer
(74) Attorney, Agent, or Firm—Joseph P. Fischer

(57) ABSTRACT

A copolymer comprising units derived from (a) methaciylic acid esters containing from about 9 to about 25 carbon atoms in the ester group and (b) methacrylic acid esters containing from 7 to about 12 carbon atoms in the ester group, said ester groups having 2-($C_{1-4}$ alkyl)-substituents, and optionally (c) at least one monomer selected from the group consisting of methacrylic acid esters containing from 2 to about 8 carbon atoms in the ester group atoms and which are different from methacrylic acid esters (a) and (b), vinyl aromatic compounds, and nitrogen-containing vinyl monomers with the proviso that no more than 60% by weight of the esters contain not more than 11 carbon atoms in the ester group. Also described are additive concentrates and lubricating oil compositions containing the copolymers and processes for preparing copolymers.

36 Claims, No Drawings

VISCOSITY IMPROVERS FOR LUBRICATING OIL-COMPOSITIONS

This application is a divisional of application Ser. No. 09/218,905, filed Dec. 12, 1998, now U.S. Pat. No. 6,124,249.

FIELD OF THE INVENTION

This invention relates to viscosity improvers, including dispersant viscosity improvers, for lubricating oils, oil compositions and concentrates containing such viscosity improvers, and a process for preparing the viscosity improvers.

BACKGROUND OF THE INVENTION

When a fluid is subjected to external forces, it resists flow due to internal friction. Viscosity is a measure of this internal friction.

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers.

Ester group containing polymers are well-known additives for improving the fluidity characteristic of lubricaiing oils. Polyacrylate, particularly polymethacrylate ester polymers are well-known and are widely used for this purpose.

Dispersants are also well-known in the lubricating art. Dispersants are employed in lubricants to keep impurities, particularly those formed during operation of machinery, in suspension rather than allowing them to deposit on the surfaces of lubricated parts.

Multifunctional additives. that provide both viscosity improving properties and dispersant properties are likewise known in the art. Such products are described in numerous publications including Dieter Klamann, "Lubricants and Related Products", Verlag Chemie Gmbh (1984), pp. 185–193; C. V. Smalheer and R. K. Smith "Lubricant Additives", Lezius-Hiles Co. (1967); M. W. Ranney, "Lubricant Additives", Noyes Data Corp. (1973), pp. 92–145, M. W. Ranney, "Lubricant Additives, Recent Developments", Noyes Data Corp. (1978), pp. 139–164; and M. W. Ranney, "Synthetic Oils and Additives for Lubricants", Noyes Data Corp. (1980), pp. 96–166. Each of these publications is hereby expressly incorporated herein by reference.

Derivatives of polyacrylate esters are well-known as additives for lubricants that provide not only improved viscosity characteristics, but also may enhance dispersant properties of lubricants.

It is desirable that the viscosity improver or dispersant viscosity improver not adversely affect the low-temperature viscosity of the lubricant containing same. Frequently, while viscosity improvers or dispersant viscosity improvers enhance the high temperature viscosity characteristics of lubricating oil, that is, they reduce the loss of viscosity with increasing temperature, low temperature properties of the treated lubricant become worse. It is also desirable that viscosity improving agents provide relatively constant fluidity characteristics under extended periods of use. Such materials usually are polymers that resist shearing.

While many lubricating oil compositions can benefit from the use of viscosity improvers, gear lubricants and automatic transmission fluids are particularly sensitive to viscosity.

Gear lubricants are subjected to high levels of shearing under use. While many conventional viscosity improving agents provide lubricants with exemplary viscosity characteristics when first prepared, after a short period of use lubricating a gear set, such as in an automobile axle or transmission, the viscosity improving agent undergoes shearing, resulting in reduced viscosity improving properties. Gear lubricants also preferably have good low temperature viscosity characteristics.

One of the major requirements for automatic transmission fluids has been improved low temperature performance. This is demonstrated by requirements for maximum Brookfield viscosities of 50,000, 20,000, 10,000 centipoise, or even lower at −40° C. The viscosity modifier, which can comprise nearly 50 weight percent and sometimes even more of the total additive system employed in an automatic transmission fluid can have a major impact on the low temperature performance. Low temperature characteristics are also desirable in other applications such as in gear lubricants and manual transmission fluids where the viscosity modifier may also comprise substantial amounts of the total additive system.

The copolymers of this invention are also useful in many other lubricating oil compositions including, but not limited to engine oils, hydraulic oils, manual transmission oils, lubricants for continuously variable transmissions (CVT) such as the well-known belt driven version invented by Van Doorne, industrial oils, etc.

Accordingly, it is desirable to provide compositions that reduce the extent of loss of viscosity at high temperatures while not adversely increasing the low temperature viscosity of lubricating oil compositions.

It is also desirable to provide viscosity improving agents that resist shearing under conditions of use.

Particularly desirable are:viscosity improving agents that both resist shearing and reduce the extent of loss of viscosity at high temperatures while not adversely increasing the low temperature viscosity of lubricating oil compositions.

It is another object of this invention to provide novel multi-purpose lubricant additives.

A more specific object is to provide multi-purpose additives directed to improving the viscosity and dispersant, properties of a lubricating composition.

A further object is to provide processes for preparing copolymers that improve viscosity characteristics of lubricants over a wide range of temperature conditions.

Still another object is to provide additive concentrates containing the novel copolymers of this invention.

Yet another object is to provide lubricants having improved dispersant and viscosity properties.

Other objects will in part be obvious in view of this disclosure and will in part appear hereinafter.

SUMARY OF THE INVENTION

In one embodiment, what is provided is a copolymer comprising units derived from
  (a) methacrylic acid esters containing from about 9 to about 25 carbon atoms in the ester group and (b) methacrylic acid esters containing from 7 to about 12 carbon atoms in the ester group, said ester groups having 2-($C_{1-4}$ alkyl)-substituents, and optionally (c) at least one monomer selected from the group consisting of methacrylic acid esters containing from 2 to about 8 carbon atoms in the ester group and which are different from methacrylic acid esters (a) and (b), vinyl aromatic compounds, and nitrogen-containing vinyl monomers, with the proviso that no more than 60% by weight of the esters contain not more than 11 carbon atoms in the ester group.

The instant invention also relates to additive concentrates and lubricating oil compositions containing the copolymers and processes for preparing copolymers.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms provided that they do not adversely affect reactivity or utility of the process or products of this invention.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated into a lubricating oil. For a further discussion of the terms oil soluble and dispersible, particularly "stably dispersible", see U.S. Pat. No. 4,320,019 which is expressly incorporated herein by reference for relevant teachings in this regard.

The expression "lower" is used throughout the specification and claims. As used herein to describe various groups, the expression "lower" is intended to mean groups containing no more than 7 carbon atoms, more often, no more than 4, frequently one or two carbon atoms.

It must be noted that as used in this specification and appended claims, the singular forms also include the plural unless the context clearly dictates otherwise. Thus the singular forms "a", "an", and "the" include the plural; for example "a monomer" includes mixtures of monomers of the same type. As another example the singular form "monomer" is intended to include both singular and plural unless the context clearly indicates otherwise.

In the context of this invention the term "copolymer" means a polymer derived from two or more different monomers. Thus, a polymer derived from a mixture of, for example, 2 or more of methyl-, butyl-, heptyl-, nonyl-, decyl-, etc. methacrylates is a copolymer as defined herein. Likewise a polymer derived from one of $C_{9-11}$-, and $C_{2-18}$- methacrylates, or a polymer having two or more distinct blocks, is a copolymer as defined herein. The copolymers of this invention also may contain units derived from nitrogen-containing monomers.

In reference to the size of the ester-groups, it is pointed out that an ester group is represented by the formula

and that the number of carbon atoms in an ester group is thus the comnbined total of the carbon atom of the carbonyl gopand the carbon atoms of the (OR) group. Thus, methyl methacrylate contains two caion atoms in the ester group. A butyl ester contains five carbon atoms in the ester group.

The expression "substantially inert" is used in reference to diluents. When used in this context, "substantially inert" means the diluent is essentially inert with respect to any reactants or compositions of this invention, that is, it will not, under ordinary circumstances, undergo any significant reaction with any reactant or composition, nor will it interfere with any reaction or composition of this invention.

The expression viscosity index (often abbreviated VI), is frequently used herein. Viscosity index is an empirical number indicating the degree of change in viscosity within a given temperature range. A high VI signifies an oil that displays a relatively small change in viscosity with temperature.

According to the preset invention a composition of matter suitable for use as a viscosity improver, including dispersant-viscosity improver, for lubricating oil compositions comprises copolymners comprising units derived from a mixture of alkl methacrylate ester monomers containing, (a) from about 9 to about 25 carbon atoms in the ester group, preferably from about 13 to about 19 carbon atoms, often to about 16 carbon atoms, and (b) from 7 to about 12 carbon atoms in the ester group, preferably from about 9 to about 12 carbon atoms, most preferably 9 carbon atoms, and which have 2-($C_{1-4}$ alkyl)-substituents, and optionally, at least one monomer selected from the group consisting of methacrylic acid esters containing from 2 to about 8 carbon in the ester group atoms and which are different from methacrylic acid esters (a) and (b), vinyl aromatic compounds, and nitrogen-containing vinyl monomers provided that no more than about 60% by weight, often no more than 50% by weight, and frequently no more than about 35% by weight of the esters contain not more than 11 carbon atoms in the ester group.

Typically, the mole ratio of esters (a) to esters (b) in the copolymer ranges from about 95:5 to about 35:65, often from about 90:10 to about 60:40, and frequently from about 80:20 to about 50:50.

The esters are usually aliphatic esters, preferably alkyl esters. Preferably, ester (a) is a $C_{12-15}$ alkyl methacrylate and ester (b) is 2-ethylhexyl methacrylate.

In one embodiment, the ester groups in ester (a) contain branched alkyl groups. Often from about 2 to about 65%, frequently from about 5 to about 60% of the ester groups contain branched alkyl groups.

As noted, the ester (b) has 2-($C_{1-4}$ alkyl)-substituents. The $C_{1-4}$ alkyl substituents may be methyl, ethyl, and any isomers of propyl and butyl. Preferably, the 2-alkyl substituent is ethyl.

The presence of groups derived from the (c) monomer is optional. In one embodiment, the polymer is free of groups derived from (c) monomers. In another embodiment, the copolymer may contain groups derived from one or more of the (c) monomers. Within the second embodiment, there exist a number of possibilities, Foe example, the (c) component may consist essentially of one of the types of recited monomers. Thus, in one embodiment the (c) monomer may be methacrylic acid ester containing from 2 to about 8 carbon atoms in the ester group. In another embodiment, the (c) monomer may be a vinyl aromatic monomer, for example a styrenic monomer, such as styrene, alpha-methyl styrene, ring substituted styrenes, vinyl naphthalenes, vinyl anthracenes. and the like. In yet another embodiment, the (c) monomer is a nitrogen containing vinyl monomer. When the (c) monomer is a nitrogen containing vinyl monomer, the copolymer generally provides enhanced dispersant properties to a lubricating oil composition. Useful nitrogen containing vinyl monomers are discussed hereinafter.

In one particular embodiment, the copolymer is substantially free of groups derived from esters of methacrylic acids containing fewer than 7 carbon atoms in the ester group, frequently fewer than 5 carbon atoms. In another embodiment, the (c) monomer comprises methacrylic ester monomers containing about 2 carbon atoms in the ester group. In one preferred embodiment, the copolymer contains groups derived from both methacrylic acid esters containing 2 carbon atoms in the ester group and a nitrogen containing vinyl monomer.

The copolymers of this invention generally have weight average molecular weight ($M_w$) ranging from about 10.000 to about 350,000 and in one embodiment to about 200,000. In another embodiment, the $M_w$ ranges from about 15,000 to about 150,000, often from about 20,000 to about 120,000.

Polydispersity (abbreviated PDI for polydispersity index) values ($M_w/M_n$), where $M_n$ denotes number average molecular weight, range from about 1.5 to about 5, often from about 2 to about 4.

Molecular weights of polymers are determined. using well-known methods described in the literature. Examples of procedures for determining molecular weights are gel permeation chromatography (also known as size-exclusion chromatography) and vapor phase osmometry. These and other procedures are described in numerous publication including:

P. J. Flory, "Principles of Polymer Chemistry" Cornell University Press (1953), Chapter VII, pp. 266–316, and "Macromolecules, an Introduction to Polymer Science", F. A. Bovey and F. H. Winslow, Editors, Academic Press (1979), pp. 296–312.

W. W. Yau, J. J. Kirkland and D. D. Bly, "Modem Size Exclusion Liquid Chromatography", John Wiley and Sons, New York, 1979.

A variety of standards may be used when determining molecular weights of polymers. It is preferred that standards be similar, chemically and physically, to the polymer being measured. When standards are used that deviate significantly from the polymer being measured, the values obtained frequently deviate significantly from the actual value for the polymer, however relative molecular weights of several polymers may be indicated.

A measurement which is complementary to a polymer's molecular weight is the melt index (ASTM D-1238). Polymers of high melt index generally have low molecular weight, and vice versa. Mooney Viscosity (ASTM Procedure D-1646-87) relates indirectly to polymer molecular weight. All other factors being equal, as molecular weight of the polymer increases, so too does the Mooney viscosity.

These esters are obtained by, for example, esterification of methacrylic acid, or the anhydride or acyl halide thereof, or by transesterification of methacrylic esters, usually lower alkyl esters, most often, methyl esters. The acetone cyanohydrin process involves the reaction of acetone with HCN to form acetone cyanohydrin which is then reacted with the desired alcohol to form the ester. Propylene carbonylation and many other processes are also used.

As noted hereinabove, the ester alkyl group is generally derived from an alcohol.

Alcohols which are useful for preparng ester (a) contain from about 8 to about 24 carbon atoms, preferably from about 12 to about 15 carbon atoms. Mixtures of alcohols are commercially available and are. frequently preferred. The alcohols used to prepare ester (a) may be linear or branched. In one embodiment, from about 2 to about 65% of the alcohols are branched, frequently from about 5 to about 60% are branched. Examples of alcohols useful to prepare ester (a) include n-octanol, n-decanol, n- and branched-$C_{12}$, $C_{15}$, $C_{16}$, and $C_{22}$ alcohols, mixtures of alcohols, e.g., $C_{12-15}$ alcohols available under the tradenames Dobanol 25, Neodol 25, Lial 125, and Alchem 125, which have varying degrees of branching, for example from about 5% to about 50% branching, or even more, and Alfol 1214, which is substantially linear.

Alcohols which are useful for preparing ester (b) contain from 6 to about 11 carbon atoms, preferably from 8 to about 11, most preferably, 8 carbon atoms. These alcohols have a 2-($C_{1-4}$ alkyl) substituent, namely, methyl, ethyl, or any isomer of propyl and butyl. Examples of alcohols useful for preparing ester (b) include 2-methylheptanol, 2-methyldecanol, 2-ethylpentanol, 2-ethylhexanol, 2-ethyl nonanol, 2-propyl heptanol, 2-butyl heptanol, etc. Especially preferred is 2-ethylhexanol.

A variety of procedures for preparing methacrylate ester monomers are described in considerable detail in the section entitled "Acrylic and Methacrylic Ester Polymers" in the Encyclopedia of Polymer Science and Engineering, Vol. 1, pp. 247–251, Wiley-Interscience, New York (1985).

Esterification reactions are well known and involve reaction of the acid, anhydride or acyl halide with a suitable alcohol, removing by product water or hydrogen halide, depending on the methacrylic reactant.

Transesterification reactions involve replacement of, generally, a lower alkyl ester group with a higher alcohol, removing the displaced lower alkyl group as the alcohol. A preferred method for transesterifying methyl methacrylate is described in U.S. Pat. No. 4,791,221 which is expressly incorporated herein by reference.

Moreover, numerous methacrylate esters are commercially available. Suppliers include, for example, RohMax; Lubrizol, San Esters Corp., with offices in New York, N.Y.; Mitsubishi Rayon Co. Ltd.; Polysciences, Inc., Warrington, Pa.; Sartomer Co., Exton, Pa.; and others.

In an optional embodiment, the copolymer contains groups derived from (c) at least one monomer selected from the group consisting of methacrylic acid esters containing from 2 to about 8 carbon atoms in the ester group atoms and which are different from methacrylic acid esters (a) and (b), vinyl aromatic compounds, and nitrogen-containing vinyl monomers. When groups derived from monomer (c) are present, they comprise from about 0.2 to about 60 mole % of the units present in the polymer, more often from about 1 to about 25 mole %.

Esters containing from 2 to about 8 carbon atoms in the ester group are not encompassed by those described hereinabove with respect to esters (a) and (b), that is, they are different from those esters.

When monomer (c) comprises methacrylic acid esters containing from 2 to about 8 carbon atoms, it is preferred that these comprise lower alkyl esters. Especially preferred is methyl methacrylate.

Useful vinyl aromatic monomers include styrene and the substituted styrenes although other vinyl aromatic monomers can also be used. The substituted styrenes include styrenes that have halo-, amino-, alkoxy-, carboxy-, hydroxy-, sulfonyl-, hydrocarbyl- wherein the hydrocarbyl group has from 1 to about 12 carbon atoms and other substituents. Exemplary of the hydrocarbyl-substituted styrenes are alpha-methylstyrene, para-tert-butylstyrene, alpha-ethylstyrene, and para-lower alkoxy styrene. Mixtures of two or more vinyl aromatic monomers can be used. Styrene is preferred.

Useful nitrogen containing monomers include those selected from the group consisting of vinyl substituted nitrogen heterocyclic monomers, for example vinyl pyridine and N-vinyl-substituted nitrogen heterocyclic monomers, for example, N-vinyl imidazole, N-vinyl pyrrolidinone, and N-vinyl. caprolactam, dialkylaminoalkyl acrylate and metiacrylate monomers, for example N,N-dialkylaminoaLkyl acrylates, for example dimethylaminoethyl methacrylate, dialkylaminoaIkyl acrylamide and methacrylamide monomers, for example di-lower alkylaminoalkylacrylamide, especially where each alkyl or aminoalkyl group contains from 1 to about 8 carbon atoms, especially from 1 to 3 carbon atoms, for example N,N- di lower alkyl, especially, dimethylaminopropylacrylamide, N-tertiary alkyl acrylamides and corresponding methacrylamides, for example tertiary butyl acrylamide, and vinyl substituted amines.

In one preferred embodiment, monomer (c) comprises a nitrogen-containing vinyl monomer. When monomer (c) is or includes a nitrogen-containing vinyl monomer, the copolymer generally contains from about 0.2, often from about 1 mole %, up to about 20 mole %, more often up to about 8 mole %, of groups derived from monomer (c).

The copolymers of this invention may be prepared by processes comprising reacting, in the presence of a free radical initiator, (a) methacrylic acid esters containing from about 9 to about 25 carbon atoms in the ester group, and (b) methacrylic acid esters containing from 7 to about 12 carbon atoms in the ester group, said ester groups having 2-($C_{1-4}$ alkyl)-substituents, and optionally (c) at least one monomer selected from the group consisting of methacrylic acid esters containing from 2 to about 8 carbon atoms in the ester group atoms and which are different from methacrylic acid esters (a) and (b), vinyl aromatic compounds, and nitrogen-containing vinyl monomers, optionally in the presence of a chain transfer agent.

The monomers may be reacted concurrently.

In one embodiment, the process comprises reacting a mixture of the monomers, often by first heating a portion, often from about 20% to about 60%, of the mixture until reaction is evident, usually by noting an exotherm, then adding and reacting the balance of the monomers, portionwise, all at once, or continuously over a period of time, until the desired copolymer is obtained.

In a particular embodiment, monomers (a) and (b), the free radical initiator, and if used, the chain transfer agent, are combined to prepare a mixture; from about 10% to about 80% by weight of the mixture is heated until an exotherm is noted; then while maintainng reaction temperature, the remaining mixture is added over about 0.25 to about 5 hours, optionally with additional initiator, whereupon the reaction is continued to completion.

As noted hereinabove, the monomers may comprise (c), a third monomer. In a particular embodiment, monomer (c) comprises a nitrogen-containing vinyl monomer. In another embodiment, monomer (c) comprises an alkyl methacrylate monomer as defined hereinabove, especially lower alkyl methacrylates, more particularly, methyl methacrylate. In an especially preferred embodiment, monomer (c) comprises both of a nitrogen-containing monomer and an alkyl methacrylate monomer, with preferred embodiments as defined hereinabove.

In one embodiment, monomer (c) is grafted onto a pre-formed methacrylate copolymer. Procedures for grafting, especially for grafting nitrogen containing monomers, are known and are described in numerous publications, for example U.S. Pat. Nos. 3,067,163; 4,281,081; and 4,338,414.

When monomer (c) is present, in one embodiment, the monomers, the free radical initiator and if used, the chain transfer agent, are combined to prepare a mixture; from about 10% to about 80% by weight, often from about 25% to about 50% by weight, of the mixture is heated until an exothenn is noted, usually after the exotherm subsides, but while maintaining reaction temperature, the remaining mixture is added over about 0.25 to about 5 hours, optionally with additional initiator, whereupon the reaction is continued to completion.

When monomer (c) is a nitrogen-containning vinyl monomer, a preferred process comprises combining monomers (a) and (b) the free radical initiator, and if used, the chain transfer agent, to prepare a first mixture; from about 10% to about 80% by weight of the mixture of monomers (a) and (b) is combined with monomer (c) to prepare a second mixture; from about 20% to about 100% of the second mixture is heated until an exotherm is noted; then while maintaining reaction temperature, first adding the balance, if any, of the second mixture over about 0.25 hour to about 5 hours followed by addition over 0.25 to about 5 hours of the remaining first mixture, optionally adding additional initiator, whereupon the reaction is continued to completion.

When monomer (c) comprises both of a nitrogen-containing vinyl monomer and a methacrylate monomer, especially a lower alkyl methacrylate monomer, the process may be conducted by preparing a first mixture comprising monomers (a) and (b) and either the lower alkyl methacrylate monomer or nitrogen-containing vinyl monomer, the free radical initiator, and if used, the chain transfer agent, then about 10% to about 80% by weight of said first mixture is combined with remaining monomer (c) to prepare a second mnixture; from about 20% to about 100% of the second mixture is heated until an exotherm is noted; then while maintaining reaction temperature, first adding the balance of the second mixture, if any, over about 0.25 hour to about 5 hours followed by addition of the remaining first mixture over 0.25 to about 5 hours, optionally adding additional initiator, whereupon the reaction is continued to completion.

In another embodiment, monomers (a), (b), and from about 10% to about 90% of monomer (c), the free radical initiator, and if used, the chain transfer agent, are combined to prepare a first mixture; from about 10% to about 80% by weight of said first mixture is combined with remaining monomer (c) to prepare a second mixture; from about 20% to about 100% of the second mixture is heated until an exotherm is noted; then while maintaining reaction temperature, the balance of the second mixture, if any, is added over about 0.25 hour to about 5 hours, followed by addition over 0.25 to about 5 hours of the remaining first mixture, optionally adding additional initiator, whereupon the reaction is continued to completion.

The processes of this invention may be conducted essentially solvent free, although it is common to employ one or more diluents to facilitate processing.

The Diluent

As noted hereinabove, the copolymers of this invention may be prepared in the presence of a diluent. A diluent may also be added to a substantially diluent-free copolymer, usually by dissolving or dispersing the substantially diluent-free polymer in an appropriate diluent In another embodiment, an additional diluent, often a higher boiling diluent such as an oil, may be added to a copolymer which was prepared in, and still contains, a lower boiling diluent which is then removed by common methods such as distillation. Preferably, when the polymer is prepared in the presence of a diluent, the diluent is an oil.

In one embodiment, the diluent is a mineral oil. In a particular embodiment the mineral oil consists essentially of hydrotreated naphthenic oil. Also contemplated are hydrodewaxed mineral oils.

The diluent may also be a synthetic oil. Common synthetic oils are ester type oils, polyolefin oligomers or alkylated benzenes.

Chain Transfer Agents

The process may be conducted in the presence of a chain transfer agent. The use of chain transfer agents to regulate and limit molecular weight in polymer reactions is known, see for example "Concise Encyclopedia of Polymer Science and Engineering", J. I. Kroschwitz, Ed., Wiley-Interscience (New York, 1990), page 139. An extensive discussion of chain transfer, its effects, and chain-transfer agents together with an extensive bibliography, appears in the "Encyclopedia of Polymer Science and Technology", H. F. Mark, N. G. Gaylord, and N. M. Bikales, Eds., Interscience, (New York, 1965), pp. 575–610. Both of these are expressly incorporated herein by reference.

For the present application, sulfur compounds, especially mercaptans, particularly dodecyl mercaptans, for example, n- and tertiary dodecyl mercaptans, are preferred.

Polymerization can take place under a variety of conditions, among which are bulk polymerization, solution polymerization, emulsion polymerization, suspension polymerization and nonaqueous dispersion techniques.

The process of tiis invention makes use of the conventional methods of radical polymerization.

Such methods are described in the work "Encyclopedia of Polymer Science and Engineering" (H. F. Mark, N. M. Bikales, C. G. Overberger and G. Menges), 2nd edition (1988), published by Wiley Interscience.

These methods include free-radical initiated polymerization employing azo compounds or peroxides. Also described therein are photochemical and radiation initiated methods.

Initiators

Useful initiators include organic peroxides, hydroperoxides and azo compounds. Redox initiators are also useful.

Free radical generating reagents useful as polymerization initiators are well known to those skilled in the art. Numerous examples of free radical initiators are mentioned in the above-referenced texts by Flory and Bovey and Winslow. An extensive listing of free radical initiators appears in J. Brandrup and E. H. lnrergut, Editors, "Polymer Handbook", 2nd edition, John Wiley and Sons, New York (1975), pp. II-1 to II-40. Numerous free radical initiators are available and many are commercially available in large quantities. Included among free radical initiators are t-butyl peroxide, t-butyl hydroperoxide, t-amyl peroxide, cumyl peroxide, dibenzoyl peroxide (Aldrich), t-butyl m-chloroperbenzoate, azobisvaleronitrile, t-butyl perocotate and tertiary-butyl perbenzoate, (Trigonox 21 and Trigonox C, respectively, both from AKZO) and 2,2'-azobis(isobutyronitrile), VAZO-64, and, 2,2'-azobis(methylbutyronitrile), VAZO-67, both from DuPont.

Free radical initiators are usually used in amounts ranging from about 0.01% to about 10 percent by weight based on the total weight of reaction mixture. Generally, the initiators are used at about 0.05% to about 3% by weight, even more often from about 0.1 to about 2%, frequently from about 0.5% to about 1.5% or to about 1% by weight.

The choice of free radical initiator can be an important consideration. Considerations include the half-life of the initiator at a given temperature, nature of the reactants, reaction temperature, solvent or diluent, and the like.

Molecular weights of the polymers can be controlled employing a number of techniques including choice of initiator, reaction temperature, concentration of monomers and solvent type. As noted previously, chain transfer agents can be used.

The products of the present invention are generally prepared at reaction temperatures ranging from about 40° C. to about 200° C., frequently, from about 60° C. to about 160° C. The half-life of an initiator at a given temperature is an important consideration.

Because acrylic polymerizations may be accompanied by liberation of considerable heat, care must be taken to avoid uncontrolled reaction. Temperatures can be controlled by using reactors with cooling jackets, controlling rates of addition and use of reaction solvents.

While the process of the instant invention is often conducted in conventional reactors employing agitation means including mechanical stirrers and/or circulating pumps, another useful means for preparing the copolymers of this invention is to employ a high energy mechanical mixing device. These include roll mills, ball mills or extruders. Of these, extruders are preferred since the comonomers can be fed to the feed hopper in any desired fashion. Methods of employing such devices, and especially extruders, are described in a number of patents including Hayashi et al, U.S. Pat. No. 4,670,173 and Sopko et al, U.S. Pat. No. 5,039,433, both of which are expressly incorporated herein by reference.

The following examples are intended to illustrate several compositions of this invention as well as means for preparing same. Unless indicated otherwise all parts are parts by weight. It is to be understood that these examples are intended to illustrate several compositions and procedures of the invention and are not intended to limit the scope of the invention. Molecular. weight values are determined employing gel permeation chromatography (GPC) employing well-characterized polyymethacrylate (PMA) calibration standards. PDI is the polydispersity index, Mw/Mn. Filtrations are conducted using a diatomaceous earth filter aid.

EXAMPLE 1

A vessel is charged with 320 parts (1.18 equivalents) of a $C_{12-15}$ methacrylate (about 20 wt % each $C_{12}$ and $C_{15}$, 30% each $C_{13}$ and $C_{14}$, and less than a total of about 5% $C_{11}$ or less and $C_{16}$ or greater), 80 parts (0.40 moles) 2-ethylhexyl methacrylate, 100 parts mineral oil (Total 85N), and 8.24 parts each of Trigonox-21 (0.039 moles) and t-dodecanethiol (0.04 moles). The materials are mixed for 0.25 hour, then ⅓ of the mixture is charged to a reactor equipped with a stirrer, $N_2$ inlet with addition funnel, thermocouple and condenser, the remaining ⅔ being charged to the addition funnel. The reactor contents are heated to 105° C. under $N_2$ @ 8.5 l/hr over about 0.2 hour whereupon an exotherm to 137° C. is observed and heating is discontinued. After about 1 minute, addition of the monomers from the addition funnel is begun at 4.4 ml/min. After about 0.3 hour the temperature is 90° C. and heating is begun to maintain 89–90° C. Addition is completed after 1.5 hour, then heating is continued for 3.2 hours. At this time the infrared spectrum indicates the polymerization is completed. The batch is stripped to 150° C. and 28 mm Hg, filtered through filter aid through a Buchner funnel with a cloth pad then refiltered through the same filter. The filtrate has Mw=60,531, Mn=18,650 and PDI=3.24.

EXAMPLE 2

The procedure of Example 1 is followed employing 280 parts (1.03 equivalents) $C_{12-15}$ methacrylate, 120 parts (0.605 moles) 2-ethylhexyl methacrylate, 100 parts Total 85N, and 8.24 parts each of Trigonox-21 (0.039 moles) and t-dodecanethiol (0.04 moles). The peak temperature after exotherm is 141° C. Infrared spectrum shows polymerization is complete after 2.8 hours following completion of addition: The batch is stripped to 150° C. at 16 mm Hg, The filtrate has Mw=56,399, Mn=19,495 and PDI=2.89.

EXAMPLE 3

The procedure of Example 1 is followed employing 340 parts (1.25 equivalents) $C_{12-15}$ methacrylate, 60 parts (0.302 moles) 2-ethylhexyl methacrylate, 100 parts Total 85N, and 8.24 parts each of Trigonox-21 (0.039 moles) and t-dodecanethiol (0.04 moles). The peak temperature after exotherm is 135° C. Infrared spectrum shows polymerization is complete after 3.2 hours following completion of addition; reaction temperature 89–92° C. The batch is stripped to 150° C. at 16 mm Hg, The filtrate has Mw=57,872, Mn=19,585 and PDI=2.95.

EXAMPLE 4

A vessel is charged with 280 parts (1.03 equivalents) $C_{12-15}$ methacrylate, 80 parts (0.4 moles) 2-thylhexyl methacrylate, 40 parts (0.4 moles) methyl methacrylate, 100 parts Total 85N, and 8.24 parts each of Trigonox-21 (0.039 moles) and t-dodecanethiol (0.04 moles). The materials are mixed for 0.25 hour, then ⅓ of the mixture is charged to a reactor equipped with a stirrer, $N_2$ inlet with addition funnel, thermocouple and condenser, the remaining ⅔ being charged to the addition funnel. The reactor contents are heated to 105° C. under $N_2$ @ 8.5 l/hr over about 0.2 hour whereupon an exotherm to 147° C. is observed and heating is discontinued. After about 1 minute, addition of the monomers from the addition funnel is begun at 4.4 ml/min. After about 0.3 hour the temperature is 90° C. and heating is begun to maintain 89–92° C. Addition is completed after 1.5 hour, then heating is continued for 1.6 hours. At this time the infrared spectrum indicates the polymerization is completed. The batch is stripped to 150° C. and 16 mm Hg, filtered through filter aid then refiltered through a Buchner funnel with a cloth pad. The filtrate has Mw=58,897, Mn=19,403 and PDI=3.03.

EXAMPLE 5

The procedure of Example 1 is followed employing 300 parts (1.11 equivalents) $C_{12-15}$ methacrylate, 100 parts (0.504 moles)2-ethylhexyl methacrylate, 100 parts Total 85N, and 8.24 parts each of Trigonox-21 (0.039 moles) and t-dodecanethiol (0.04 moles). The peak temperature after exotherm is 136° C. Infrared spectrum shows polymerization is complete after 2 hours following completion of addition; reaction temperature 89–91° C. The batch is stripped to 150° C. at 14 mm Hg. The filtrate has Mw=61,510, Mn=20,622 and PDI=2.98.

EXAMPLE 6

The procedure of Example 1 is followed employing 280 parts (1.03 equivalents) $C_{12-15}$ methacrylate, 120 parts (0.605 moles) 2-ethylhexyl methacrylate, 100 parts Total 85N, and 7.6 parts each of Trigonox-21 (0.035 moles) and t-dodecanethiol (0.038 moles). The peak temperature after exotherm is 145° C. Infrared spectrum shows polymerization is complete after 2 hours following completion of addition; reaction temperature 109–110° C. The batch is stripped to 150° C. at 11 mm Hg. The filtrate has Mw=52,263, Mn=17,254 and PDI=3.03.

EXAMPLE 7

A vessel is charged with 3696 parts (13.64 equivalents) of $C_{12-15}$ methacrylate, 1584 parts (7.99 moles) (2-ethylhexyl methacrylate, 1320 parts mineral oil Total 85N), and 100.3 parts each of Trigonox-21 (0.47 moles) and t-dodecanethiol (0.50 moles). The materials are mixed for 0.25 hour, then ⅓ of the mixture is charged to a reactor equipped with a stirrer, $N_2$ inlet with addition funnel, thermocouple and condenser, the remaining ⅔ being charged to the addition funnel. The reactor contents are heated to 110° C. under $N_2$ @ 9.9 l/hr over about 0.4 hour whereupon an exotherm to 152° C. is observed and heating is discontinued. After about 1 minute temperature is 151° C., addition of the monomers from the addition funnel is begun at 60 ml/min. After about 0.5 hour the temperature is 110° C. and heating is begun to maintain 108–113° C. Addition is completed after 1.6 hour, then heating is continued for 2 hours, whereupon the infrared spectrum shows polymerization is incomplete. An additional 2 parts Trigonox-21 are added, heating is continued for 2 hours, whereupon the infrared spectrum indicates the polymerization is completed. The batch is stripped to 150° C. and 12 mm Hg, filtered through filter aid through a Buchner funnel with a cloth pad. The filtrate has Mw=47,997, Mn=16,728 and PDI=2.87.

EXAMPLE 8

The procedure of Example 7 is followed except 90 parts each of Trigonox-21 (0.43 moles) and tdodecanethiol (0.44 moles) are used. The exotherm is to 150° C., the reaction temperature is 109–116° C., 3 hours after addition of monomers is completed an additional 3 part Trigonox-21 are added whereupon after 0.5 hour additional heating the infrared spectrum indicates the polymerization is completed. The filtrate has Mw=51,200, Mn=17,295 and PDI=2.96.

EXAMPLE 9

The procedure of Example 7 is followed except 79.2 parts each of Trigonox-21 (0.367 moles) and t-dodecanethiol (0.392 moles) are used. The exotherm is to 151° C., the reaction temperature is 108–113° C. 3.5 hours after addition of monomers is completed the infrared spectrum indicates the polymerization is completed. The filtrate has Mw=56,044, Mn=19,157 and PDI=2.92.

EXAMPLE 10

The procedure of Example 9 is followed except 2.6 hours after the addition is completed, 2 parts additional Trigonox-21 are added, and after 2 more hours of heating, the infrared

EXAMPLE 11

A vessel is charged with 272.8 parts $C_{12-15}$ methacrylate, 120 parts 2-ethylhexyl methacrylate, 100 parts mineral oil (Total 85N), and 7.6 parts each Trigonox 21 and t-dodecyl mercaptan. The materials are stirred for 0.25 hour, then about ⅓ of the mixture and 7.2 parts dimethylaminopropylmethacrylamide are charged to a reactor equipped with a stirrer, thernmocouple, $N_2$ inlet with addition funnel and condenser. The remaining ⅔ of the mixture is placed in the addition funnel. The mixture in the flask is heated to 110° C. under $N_2$, over 0.2 hour whereupon an exotherm ensues with an increase in temperature to 144° C. After about 0.1 hour the temperature is 140° C. and addition of the mixture from the addition funnel is begun @ 4.4 ml/hour. Within 0.2 hour the temperature is 110° C. The addition is continued for 1.5 hours, maintaining temperature at 107–114° C. Heating is continued for 3 hours at about 110° C., 0.4 part additional Trigonox 21 is added and after an additional 2.5 hours at about 110° C., the infrared spectrum indicated the reaction is completed. The batch is stripped to 150° C. and 12 mm Hg, cooled to 85° C. and filtered twice through a Buchner funnel employing filter aid. The filtrate has Mw=50,018, Mn=14,618 and PDI=3.42.

EXAMPLE 12

A vessel is charged with 272.8 parts $C_{12-15}$ methacrylate, 120 parts 2-ethylhexyl methacrylate, 100 parts mineral oil (Total 85N), and 5 parts each Trigbnox 21 and t-dodecyl mercaptan. The materials are stirred for 0.25 hour, then about ⅓ of the mixture and 7.2 parts dimethylaminopropylmethacrylamide are charged to a reactor equipped with a stirrer, thermocouple, $N_2$ inlet with addition funnel and condenser. The remaining ⅔ of he mixture is placed in the addition funnel. The mixture in the flask is heated to 110° C. under $N_2$, over 0.2 hour whereupon an exotherm ensues with an increase in temperature to 141° C. After the exottherm subsides (1 minute) the temperature is 140° C., addition of remaining monomers is begun and is continued over 1.5 hours, temperature range is 108–112° C. After heating at 108–110° C. for 3 hours, 0.5 part additional Trigonox 21 is added and heating at 110° C. is continued for 2 hours, then materials are stripped to 135° C. at 50 mm Hg. The residue is mixed with 37.6 parts additional oil. The product has Mw=59,201, Mn=24,232 and PDI=2.44.

EXAMPLE 13

The procedure of Example 7 is followed. The reaction after addition of all monomers is for 2.5 hours at which time infrared spectrum indicates reaction not quite completed. An additional 2.5 parts Trigonox 21 are added and after 2 hours at 110° C. infrared shows reaction is complete. The filtrate has Mw=46,271, Mn=14,689 and PDI=3.15.

EXAMPLE 14

The procedure of Example 13 is repeated except 1320 parts of Total 85N oil is replaced with a mixture of 1219.7 parts Total 85N and a 150N mineral oil. Mw=41,490, Mn=18,770 and PDI=2.21.

EXAMPLE 15

A vessel is charged with 3601 parts $C_{12-15}$ methacrylate, 1584 parts 2-ethylhexyl methacrylate, 1280 parts Total 85N, and 40 parts each 150N mineral oil, Trigonox 21 and t-dodecyl mercaptan. The materials are stirred for 0.25 hour, then about ⅓ of the mixture and 95 parts dimethylamninopropylmethacrylamide are charged to a reactor equipped with a stirrer, thermocouple, $N_2$ inlet with addition funnel and condenser. The remaining ⅔ of the mixture is placed in the addition funnel. The mixture in the flask is heated to 110° C. under $N_2$, over 0.4 hour whereupon an exotherm ensues with an increase in temperature to 149° C. After the exotherm subsides (3 minutes) the temperature is 148° C., addition of remaining monomers is begun and is continued over 1.6 hours, temperature is 110° C. 0.6 hour after peal exotherm and remaining addition is at 108–113° C. After heating at 108–11° C. for 2.5 hours, infra-red spectrum indicates addition is not quite complete; 2.5 part additional Trigonox 21 is added and heating at 110° C. is continued for 2 hours, with infra-red showing reaction is complete. Materials are stripped to 120° C. at 50 mm Hg. The residue is mixed with 503 parts additional Total 85N. The product has Mw=61,074, Mn=27,521 and PDI=2.22.

EXAMPLE 16

A vessel is charged with 3696 parts (13.64 equivalents) of $C_{12-15}$ methacrylate, 1584 parts (7.99 moles) (2-ethylhexyl methacrylate, 1281.5 parts Total 85N, 38.5 parts each 150N mineral oil, Trigonox-21 and t-dodecanethiol. The materials are mixed for 0.25 hour, then ⅓ of the mixture is charged to a reactor equipped with a stirrer, $N_2$ inlet with addition funnel, thermocouple and condenser, the remaining ⅔ being charged to the addition funnel. The reactor contents are heated to 110° C. under $N_2$ over about 0.4 hour whereupon an exotherm to 150° C. is observed and heating is discontinued. After about 2 minutes temperature is 149° C., addition of the monomers from the addition funnel is begun at 60 ml/min. After about 0.5 hour the temperature is 110° C. and heating is begun to maintain 108–113° C. Addition is completed after 1.6 hour, then heating is continued for 2.5 hours, whereupon the infrared spectrrun shows polymerization is incomplete. An additional 2.5 parts Trigonox-21 are added, heating is continued for 2 hours, whereupon the infrared spectrum indicates the polymerization is completed. The batch is mixed with 351.5 parts Total 85 then filtered through a Buchner funnel with a cloth pad. The filtrate has Mw=86,299, Mn=36,473 and PDI=2.37.

EXAMPLE 17

A vessel is charged with 280 parts (1;02 equivalents) $C_{12-15}$ (Lial 125) methacrylate, 120 parts (0.605 moles) 2-ethylhexyl methacrylate, 100 parts Total 85N, and 8.0 parts each of Trigonox-21 (0.039 moles) and t-dodecanethiol (0.04 moles). The materials are mixed for 0.25 hour, then ⅓ of the mixture is charged to a reactor equipped with a stirrer, $N_2$ inlet with addition funnel, thermocouple and condenser, the remaining ⅔ being charged to the addition funnel. The reactor contents are heated to 110° C. under $N_2$ over about 0.2 hour whereupon an exotherm to 147° C. is observed and heating is discontinued After about 4 minutes, addition of the monomers from the addition funnel is begun at 4.4 ml/min. After about 0.3 hour the temperature is 110° C. and heating is begun to maintain 106–111° C. Addition is completed after 1.5 hour, then heating is continued for 1.6 hours. Ad additional 0.8 part Trigonox 21 is added, heating is continued for 3 hours. At this time the infrared spectrum indicates the polymerization is completed. The batch is stripped to 150° C. and 24 mm Hg. The residue is filtered through filter aid. The filtrate has Mw=49,245, Mn=15,903 and PDI=3.10.

Previous paragraph continuation (from top of page): spectrum indicates the polymerization is completed. The filtrate has Mw=55,987, Mn=18,635 and PDI=3.00.

EXAMPLE 18

The procedure of Example 17 is repeated, replacing. the methacrylate from Lial 125 with one derived from Alchem 125 alcohol. Maximum temperature after exotherm is 140° C., 0.6 part additional Trigonox 21 instead of 0.8 part is added and stripping is done to 150° C. and 24 mm Hg. Filtrate has Mn=53,931, Mw=17,335 and PDI=3.11.

The Oil of Lubricating Viscosity

The lubricating compositions and methods of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpplymerized olefins, etc. and mixtures thereof, alkylbenzenes, polyphenyl, (e.g., biphenyls, terphenyls, alkylated polyphenyls, etc.), alkylated diphenyly ethers and alkylated. diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyolethers.

Other synthetic lubricating oils include liquid esters of phosphorus-containing acids, polymeric tetrrlydrofrrans and the like, silicon-based oils such as the polyalkyl-, polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one, or more properties. Refined oils include solvent refined oils, hydrorefined oils, hydrofinished oils, hydrotreated oils, and oils obtained by hydrocracldng and hydroisomerization techniques.

Rerefined oils are obtained by processes s imilar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. Pat. No. 4,326,972, European Patent Publication 107,282, and A. Sequeria, Jr., Lubricant Base Oil and Wax Processing, Chapter 6, Marcel Decker, Inc., New York (1994), each of which is hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

As mentioned, lubricating oil compositions of this invention may contain other components. The use of such additives is optional and the presence thereof in the compositions of this invention will depend on the particular use and level of performance required. Thus the. other additive may be included or excluded. The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, pour point depressiing agents, extreme pressure agents, anti-wear agents, color stabilizers and anti-foam agents. The above-mentioned dispersants and viscosity improvers may be used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, phosphoric acid and salts thereof, molybdenum compounds, and the like.

Auxiliary viscosity improvers (also sometimes referred to as viscosity index improvers or viscosity modifiers) may be included in the compositions of this invention. Viscosity improvers are usually polymers, including polyisobutenes, polymeithacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or anti-oxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Simalheer and R. Kennedy Smith (Lezius-Hiles Company Publisher, Cleveland, Ohio, 1967). Pour point depressants useful for the purpose of this invention, techniques for their preparation and their use are described in U.S. Pat. No. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to. reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | 5,696,067 |
| 3,351,552 | 3,541,678 | 5,696,068 |
| | | RE 26,433 |

(2) Reaction products of relatively high molecular weight aliphatic or alicyclic halides with amines, preferably polyakylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,402,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated "other" additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

Lubricating oil compositions will contain a major amount of oil of lubricating viscosity and a minor amount of a composition of this invention. By major amount is meant more than 50% by weight. When more than two components are present, a major amount usually constitutes more than 50% by weight, but will always constitute the greatest part of the composition. In particular, lubricating oil compositions may contain as little as 1% by weight, and often contain from about 3 or 4 to about 40% by weight, often up to about 35% by weight of the products of this invention, frequently up to about 25% by weight. Gear lubricant compositions frequently contain from about 5 to about 40% by weight, often up to about 35% often up to about 30% by weight of the products of this. invention. Automatic transmission fluids typically contain from about 4 to about 20% by weight of the products of this invention. In some embodiments, lubricating oil compositions may contain as little as 1% by weight up to about 15% by weight, and often from about 2% to about 9% by weight of the products of this invention.

The various additives described herein can be added directly to the lubricant. Preferably, however, they are diluted with a substantially inert, normally liquid organic diluent such as mineral oil, naphtha, benzene, toluene or xylene, to form an additive concentrate. Preferred additive concentrates contain the diluents referred to hereinabove.

Additive concentrates usually coniprise about 0.1 to about 90% by weight, and often even more, of the compositions of this invention and may contain, in addition, one or more other additives known in the art or described hereinabove. Concentrations such as 15%, 20%, 30% or 50% or higher mnay be employed. When the additive concentrates contain other additives, frequently the amount of composition of this invention will range from about 10% to about 90% by weight, often 15–50%, often about 50% by weight.

The lubricating compositions of this invention are illustrated by the examples in the following Tables. The lubricating compositions are prepared by combining the specified ingredients, individually or from concentrates, in the indicated amounts andoil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. When products of the foregoing examples are employed, unless otherwise indicated, the amounts are as prepared, with no adjustment for diluent. These examples are presented for illustrative purposes only, and are not intended to limit the scope of this invention.

EXAMPLES A–K

Gear lubricant compositions are prepared by mixing the indicated amounts (parts by weight) of the products of the listed Examples, with 0.8 part of a styrene-maleate ester-methyl methacrylate copolymer, and 6.5 parts of an additive containing 20.32 parts of the product obtained by reacting a hydroxypropyl ester of di-(methylamyl) dithiophosphate with $P_2O_5$ and neutralizing with a branched primary amine, 5.38 parts of oleyl amine, 1.54 parts oleylamide, 1.28 parts mineral oil, 0.92 part carboxylic polymer antifdam, 68.19 parts of a sulfurized isobutylene, and 2.37 parts of an 80% in mineral spirits solution of the reaction product of heptylphenol, formaldehyde, and 2,5-dimercapto1,3,4-thiadiazole in a mineral oil basestock (Exxon, 90 Neutral) to provide 100 parts of oil composition.

|  | Example | | | | | | | | | | |
|---|---|---|---|---|---|---|---|---|---|---|---|
|  | A | B | C | D | E | F | G | H | I | J | K |
| Product of Example | | | | | | | | | | | |
| 1 | 25 | | | | | | | | | | |
| 2 | | 28.6 | | | | | | | | | |
| 3 | | | 25.8 | | | | | | | | |
| 4 | | | | 25 | | | | | | | |
| 5 | | | | | 26 | | | | | | |
| 6 | | | | | | 30 | | | | | |
| 7 | | | | | | | 30 | | | | |
| 8 | | | | | | | | 27 | | | |
| 9 | | | | | | | | | 27 | | |
| 10 | | | | | | | | | | 27 | |
| 11 | | | | | | | | | | | 30 |

Viscometrics of lubricating oil compositions A–K are set forth in the following table. Kinematic viscosity @ 100° C. is determined using ASTM D-445, which covers, in general, the determination of kinematic viscosity of liquid petroleum products by measuring the time for a volume of liquid to flow under gravity through a calibrated glass capillary viscometer. Brookfield viscosity is determined employing ASTM procedure D2983, Standard Test Method for Low Temperature Viscosity of Automotive Fluid Lubricants Measured by Brookfield Viscometer, both of which appear in the Annual Book of ASTM Standards, Section 5, ASTM, Philadelphia, Pa., USA.

| Lubricant Example | Brookfield Viscosity @ −40° C. (centipoise) | Kinematic Viscosity @ 100° C. (centistokes) |
|---|---|---|
| A | 106,000 | 15.22 |
| B | 158,000 | 17.39 |
| C | 140,000 | 15.13 |
| D | 138,000 | 15.89 |
| E | 134,000 | 16.07 |
| F | 164,000 | 16.94 |
| G | 208,000 | 15.41 |
| H | 118,000 | 14.51 |
| I | 128,000 | 15.40 |
| J | 122,000 | 14.93 |
| K | 182,000 | 17.66 |

A gear lubricant composition is prepared by mixing the indicated amounts (parts by weight) of the products of the listed Examples, and 10 parts of an additive concentrate containing 15.53 parts of the product obtained by reacting a hydroxypropyl ester of di-(methylamyl) dithiophosphate with $P_2O_5$ and neutralizing with a branched primary amine, 0.57 part mineral oil, 8.4 parts of magnesium overbased (MR 14.7) alkyl benzene sulfonic acid, 7.1 parts of polyisobutene (Mn~1000) substituted succinic anhydride/ethylene polyamine reaction product, 2.9 parts glycerol monooleate, 3.2 parts triphenylphosphite, 0.96 part carboxylic polymer antifoam, 41.19 parts of a sulfurized isobutylene, and 5.2 parts of the reaction product of a polyisobutene (Mn~1000) substituted succinic arihydride/pentaerythritol polyester further reacted with an ethylene polyamine then with 2,5-dimercapto1,3,4-thiadiazole, in a synthetic oil basestock made up of an 84 part proportion of polyalphaolefin (4 centistokes @ 100° C.) (Emery 3004) oil and a 16 part proportion of diester oil (3 centistokes) (Emery 2958), to provide 100 parts of lubricating oil composition.

|  | Example | | | | | | | | | | |
|---|---|---|---|---|---|---|---|---|---|---|---|
|  | L | M | N | O | P | Q | R | S | T | U | V |
| Product of Example | | | | | | | | | | | |
| 1 | 28 | | | | | | | | | | |
| 2 | | 28 | | | | | | | | | |
| 3 | | | 28 | | | | | | | | |
| 4 | | | | 27 | | | | | | | |
| 5 | | | | | 28 | | | | | | |
| 6 | | | | | | 32 | | | | | |
| 7 | | | | | | | 32 | | | | |
| 8 | | | | | | | | 32 | | | |
| 9 | | | | | | | | | 31 | | |
| 10 | | | | | | | | | | 31 | |
| 11 | | | | | | | | | | | 32 |

Viscometrics of lubricating oil compositions L–V are set forth in the following table. Procedures are the same as for Examples A–K.

| Lubricant Example | Brookfield Viscosity @ −40° C. (centipoise) | Kinematic Viscosity @ 100° C. (centistokes) |
|---|---|---|
| L | 17,600 | 15.21 |
| M | 17,800 | 14.82 |
| N | 15,400 | 14.50 |
| O | 21,000 | 14.84 |
| P | 17,200 | 15.12 |

| Lubricant Example | Brookfield Viscosity @ −40° C. (centipoise) | Kinematic Viscosity @ 100° C. (centistokes) |
| --- | --- | --- |
| Q | 25,500 | 16.77 |
| R | 22,500 | 14.61 |
| S | 22,500 | 15.74 |
| T | 21,500 | 16.16 |
| U | 22,000 | 15.56 |
| V | 30,500 | 17.42 |

Lubricating compositions are often subjected to conditions that can result in shearing of the polymer, resulting in reduction of viscosity improving properties. Accordingly, shear stability of polymer containing blends is frequently important. Several tests are available to measure a compositions resistance to shear under conditions of high shear stress.

One useful test is the KRL Tapered Bearing Shear Test. This is a published standard test entitled "Viscosity Shear Stability of Transmission Lubricants" and is described in CEC L-45-T93, available from CEC, 61 New Cavendish Street, London WIM 8AR, England. The same test is also published as DIN 51 350, part 6, and is available from Deutsches Institut fur Normung, Burgerfenshase 6, 1000 Berlin 30, Germany. Both of these references are incorporated herein by reference. Employing this procedure for 20 hours, the shear loss of several of the foregoing examples is determined:

| Lubricant Example | 100° C. Vis (after shear) | % Vis Loss |
| --- | --- | --- |
| B | 13.22 | 23.98 |
| F | 13.19 | 22.14 |
| K | 12.11 | 20.38 |
| P | 13.73 | 18.13 |
| Q | 12.73 | 12.87 |
| R | 13.10 | 16.77 |
| S | 13.07 | 19.12 |

EXAMPLE W

An automatic transmission fluid composition is prepared by mixing 1.5 parts polyisobutene ($M_n$=1000) substituted succinic anhydride-polyethylene polyamine reaction product, 0.15 part dibutyl hydrogen phosphite, 0.25 part boronated polyisobutene ($M_n$=1000) substituted succinic anhydride-polyethylene polyarnine reaction product, 0.2 part boronated $C_{16}$ epoxide, 0.63 part di-(nonylphenyl) amine, 0.5 part propylene oxidelt-dodecyl mercaptan reaction product, 0.05 part ethoxylated N-fatty propane diamine, 0.1 part ethoxylated oleyl imidazoline, 0.6 part sulfolene-decyl alcohol reaction product, 0.03 part tolyl triazole, 0.2 part calcium overbased (MR =1.2) alkyl benzene sulfonate, 0.025 part red dye, and 0.04 part silicone antifoam agent into a mineral oil basestock to prepare 100 parts of lubricant. The product of Example 1 11.8 parts, is added to prepare 100parts of modified lubricant. The resulting composition has viscosity @ 40° C.=34.47 centistokes, @ 100° C.=7.25 centistokes, VI=182, and Brookfield (−40° C.)=12,200 centipoise.

EXAMPLES X–Z

An additive concentrate is prepared by combining 15.16 parts of calcium overbased (MR 1.1) sulfuized alkyl phenol, 11.5 parts of calcium overbased (MR 16) petroleum sulfonate, 6.05 parts barium overbased (MR 5) fatty acid/heptyl phenol, 3.7 parts sulfolene-decyl alcohol reaction product, 0.5 parts of a silicone antifoam agent, 24.69 parts of a hydrocarbon diluent, and mineral oil to make the total 100 parts.

EXAMPLE X

A lubricating oil composition is prepared by nixing tbgether 8.97 parts of the additive concentrate and 91.03 parts of mineral oil lubricating oil. A final lubricating oil composition is prepared by mixing 89.1 parts of the lubricating oil and 10.9 parts of the product of Example 12. The resulting composition has viscosity @ 40° C.=39.03 centistokes, @ 100° C.=7.85 centistokes, VI=177, and Brookfield (−40° C.)=19,400 centipoise.

EXAMPLE Y

A lubricating oil composition is prepared by mixing together 9.0 parts of the additive concentrate, 280 ppm red dye, and 91.0 parts of mineral oil lubricating oil. A final lubricating oil composition is prepared by mixing 90 parts of the lubricating oil and 10 parts of the product of Example 12. The resulting composition has viscosity @ 40° C.=36.29 centistokes, @ 100° C.=7.51 centistokes, VI=181, and Brookfield (−40° C.)=13,400 centipoise.

EXAMPLE Z

A lubricating oil composition is prepared by mixing together 7.2 parts of the additive concentrate, 220 ppm of red dye, and 92.8 parts of mineral oil lubricating oil. A final lubricating oil composition is prepared by mixing 90.15 parts of the lubricating oil and 9.85 parts of the product of Example 12. The resulting composition has viscosity @ 40° C.=36.97 centistokes, @ 100° C.=7.65 centistokes, VI=182, and Brookfield (−40° C.)=12,400 centipoise.

EXAMPLE AA

An additive concentrate is prepared by mixing 15.7 parts polyisobutene ($M_n$=1000) substituted succinic anhydride-polyethylene polyamine reaction product, 2.24 parts of $CS_2$ posttreated polyisobutene ($M_n$=1000) substituted succinic anhydride-polyethylene polyamine reaction product, 2.7 parts dibutyl hydrogen phosphite, 0.5 parts 85% phosphoric acid, 4.5 parts boronated polyisobutene ($M_n$=1000) substituted succinic anhydride-polyethylene polyamine reaction product, 2.7 parts boronated $C_{16}$ epoxide, 5.9 parts di-(nonylphenyl) amine, 1.2 parts N-phenylalpha naphthyl amine, 6.7 parts propylene oxide/t-dodecyl mercaptan reaction product, 0.27 part ethoxylated N-fatty propane diamine, 1.1 part fatty dialkyl phosphite, and 0.53 part ethoxylated oleyl imidazoline and sufficient mineral oil diluent to prepare 100 parts by weight of concentrate. An automatic transmission lubricating oil composition is prepared by mixing together, 8.5 parts of this additive concentrate, 250 ppm red dye and 91.5 parts oil. A final lubricating oil composition is prepared by mixing 11.7 parts of the product of Example 12, 0.8 part of a styrene-maleate ester pour point depressant and 87.3 parts of the lubricating oil composition. The resulting composition has viscosity @ 40° C.=35.76 centistokes, @ 100° C.=7.72 centistokes, VI=194, and Brookfield (−40° C.)=8,520 centipoise.

EXAMPLES AB–AE

An additive concentrate is prepared by mixing 7.28 parts of a Mg overbased (MR 14.7) alkyl benzene sulfonic acid, 7.06 parts polyisobutene ($M_n$=1000) substituted succinic anhydride-polyethylene polyamine reaction product, 41.9 parts of sulfulrized isobutylene, 4.60 parts of polyethylene polyamine posttreated polyisobutene ($M_n$=1000) substituted succinic anhydnide-pentaerythfitol reaction product, 1.77 parts of S-alkylated 2,5-dimercapto1,3,4-thiadiazole, 2.94 parts glycerol monooleate, 3.29 parts triphenyl phosphite, 0.96 parts of a mixture of silicone-containing and carboxylic polymer antifoam agents, 15.53 parts of the product obtained by reacting a hydroxypropyl ester of di-(methylamyl) dithiophosphate with $P_2O_5$ and neutralizing. with a branched pimnay amine, and sufficient mineral oil diluent to make 100 parts of concentrate. Manual transmission lubricants are prepared by mixing 1 part by weight (pbw) of an 80% in oil solution of a styrene-maleate ester-methyl methacrylate copolymer, the indicated amounts (pbw) of this additive concentrate, product of Example 6 and basestock indicated in the following table:

|  | Example | | | |
| --- | --- | --- | --- | --- |
|  | AB | AC | AD | AE |
| Concentrate | 8.5 | 10 | 8.5 | 8.5 |
| Prod. Of Ex. 6 | 13.5 | 40 | 37 | 35 |
| Mineral oil (90 N) | 52 |  |  |  |
| Mineral oil (150 N) | 25 |  | 53.5 | 45.5 |
| Mineral oil (600 N) |  |  |  | 10 |
| 6 cSt polyalphaolefin |  | 50 |  |  |

Viscometrics of gear oil compositions AB–AE are set forth in the following table. Procedures are the same as for Examples A–K.

| Lubricant Example | Brookfield Viscosity @ −40° C. (centipoise) | Kinematic Viscosity @ 100° C. (centistokes) |
| --- | --- | --- |
| AB | 124000 | 8.26 |
| AC | 128400 | 26.13 |
| AD | 57500 | 25.85 |
| AE | 108800 | 25.97 |

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not be susceptible to easy description. Nevertheless, all such modifications and reaction products are included within the scope of the present invention; the present invention encompasses the composition prepared by admixing the components described above.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process comprising reacting, in the presence of a free radical initiator
    (a) methacrylic acid esters containing from about 9 to about 25 carbon atoms in the ester group, and
    (b) methacrylic acid esters containing from 7 to about 12 carbon atoms in the ester group, said ester groups having 2-($C_{1-4}$ alkyl)-substituents, and optionally
    (c) at least one monomer selected from the group consisting of methacrylic acid esters containing from 2 to about 8 carbon atoms in the ester group and which are different from methacrylic acid esters (a) and (b), vinyl aromatic compounds, and nitrogen-containing vinyl monomers, with the proviso that no more than 60% by weight of the esters contain not more than 11 carbon atoms in the ester group, optionally in the presence of a chain transfer agent.

2. The process of claim 1 wherein the mole ratio of esters (a) to esters (b) ranges from about 95:5 to about 35:65.

3. The process of claim 1 wherein monomers (a) and (b), the free radical initiator, and if used, the chain transfer agent, are combined to prepare a mixture; from about 10% to about 80% by weight of the mixture is heated until an exotherm is noted; then while maintaining reaction temperature, the remaining mixture is added over about 0.25 to about 5 hours, optionally with additional initiator, whereupon the reaction is continued to completion.

4. The process of claim 1 wherein from about 2 to about 65% of the ester groups in ester (a) contain branched alkyl groups.

5. The process of claim 1 wherein from about 0.2 to about 60 mole % of the monomers are monomer (c).

6. The process of claim 5 wherein monomer (c) comprises a nitrogen-containing vinyl monomer.

7. The process of claim 5 wherein monomer (c) comprises a lower alkyl methacrylate.

8. The process of claim 5 wherein monomer (c) comprises a lower alkyl methacrylate and a nitrogen-containing vinyl monomer.

9. The process of claim 1 wherein monomer (b) comprises 2-ethylhexyl methacrylate.

10. The process of claim 7 wherein monomer (b) comprises 2-ethylhexyl methacrylate and monomer (c) comprises methyl methacrylate.

11. The process of claim 6 wherein the nitrogen-containing vinyl monomer is selected from the group consisting of dimethylaminopropylmethacrylamide and dimethylaminoethyl methacrylate.

12. The process of claim 1 wherein the monomers are reacted concurrently.

13. The process of claim 1 wherein monomer (c) is grafted onto a preformed polymethacrylate prepared by reacting monomers (a) and (b).

14. The process of claim 13 wherein monomer (c) comprises a nitrogen-containing vinyl monomer.

15. The process of claim 12 wherein the monomers, the free radical initiator, and if used, the chain transfer agent, are combined to prepare a mixture; from about 10% to about 80% by weight of the mixture is heated until an exotherm is noted; then while maintaining reaction temperature, the remaining mixture is added over about 0.25 to about 5 hours, optionally with additional initiator, whereupon the reaction is continued to completion.

16. The process of claim 5 wherein monomers (a) and (b), the free radical initiator, and if used, the chain transfer agent, are combined to prepare a first mixture; from about 10% to about 80% by weight of the first mixture of monomers (a) and (b) is combined with monomer (c) to prepare a second mixture; from about 20% to about 100% of the second mixture is heated until an exotherm is noted; then while maintaining reaction temperature, first. adding the balance, if any, of the second mixture over about 0.25 hour to about 5 hours followed by addition over 0.25 to about 5 hours of the remaining first mixture, optionally adding additional initiator, whereupon the reaction is continued to completion.

17. The process of claim 16 wherein monomer (c) comprises a nitrogen-containing vinyl monomer.

18. The process of claim 16 wherein monomer (c) comprises a lower alkyl methacrylate.

19. The process of claim 10 wherein monomer (c) comprises a lower alkyl methacrylate and a nitrogen-containing vinyl monomer.

20. The process of claim 8 wherein monomers (a), (b), and either the lower alkyl methacrylate or nitrogen-containing vinyl monomers from (c), the free radical initiator, and if used, the chain transfer agent, are combined to prepare a first mixture; from about 10% to about 80% by weight of said first mixture is combined with remaining monomer (c) to prepare a second mixture; from about 20% to about 100% of the second mixture is heated until an exotherm is noted; then while maintaining reaction temperature, first adding the balance of the second mixture, if any, over about 0.25 hour to about 5 hours followed by addition of the remaining first mixture over 0.25 to about 5 hours, optionally adding additional initiator, whereupon the reaction is continued to completion.

21. The process of claim 20 wherein the lower alkyl-.methacrylate from (c) is combined with monomers (a) and (b) to prepare the first mixture.

22. The process of claim 20 wherein the nitrogen-containing vinyl monomer from (c) is combined with monomers (a) and (b) to prepare the first mixture.

23. The process of claim 8 wherein monomers (a), (b), and from about 10% to about 90% of monomer (c), the free radical initiator, and if used, the chain transfer agent, are combined to prepare a first mixture; from about 10% to about 80% by weight of said first mixture is combined with remaining monomer (c) to prepare a second mixture; from about 20% to about 100% of the second mixture is heated until an exotherm is noted; then while maintaining reaction temperature, the balance of the second mixture, if any, is added over about 0.25 hour to about 5 hours, followed by addition over 0.25 to about 5 hours of the remaining first mixture, optionally adding additional initiator, whereupon the reaction is continued to completion.

24. The process of claim 23 wherein monomer (c) comprises a nitrogen-containing vinyl monomer.

25. The process of claim 23 wherein monomer (c) comprises a lower alkyl methacrylate.

26. The process of claim 23 wherein monomer (c) comprises a lower alkyl methacrylate and a nitrogen-containing vinyl monomer.

27. A product prepared by the process of claim 1.

28. A product prepared by the process of claim 16.

29. An additive concentrate comprising a normally liquid organic diluent and from about 20 to about 95% by weight of the product of claim 27.

30. An additive concentrate comprising a normally liquid organic diluent and from about 20 to about 95% by weight of the product of claim 28.

31. A lubricating oil composition comprising a major amount of an oil of lubricating viscosity and a minor amount of the product of claim 27.

32. A lubricating oil composition comprising a major amount of an oil of lubricating viscosity and a minor amount of the product of claim 28.

33. A gear lubricant composition comprising an oil of lubricating viscosity and from about 5 to about 40% by weight of the product of claim 27.

34. A gear lubricant composition comprising an oil of lubricating viscosity and from about 5 to about 40% by weight of the product of claim 28.

35. An automatic transmission fluid comprising an oil of lubricating viscosity and from about 4 to about 20% by weight of the product of claim 27.

36. An automatic transmission fluid comprising an oil of lubricating viscosity and from about 4 to about 20% by weight of the product of claim 28.

* * * * *